United States Patent [19]
Renkes et al.

[11] Patent Number: 5,729,416
[45] Date of Patent: Mar. 17, 1998

[54] MOTOR STARTER AND PROTECTOR MODULE

[75] Inventors: Kenneth Ray Renkes; Robert William Damerow, both of Morrison, Ill.

[73] Assignee: General Electric Company, Fort Wayne, Ind.

[21] Appl. No.: 453,278

[22] Filed: May 30, 1995

[51] Int. Cl.$^6$ .................................................. H02H 5/04
[52] U.S. Cl. ........................... 361/23; 361/26; 361/27; 361/734; 310/71
[58] Field of Search .................................... 361/728, 729, 361/730–732, 734, 807, 809, 811, 23–34; 310/67 R, 68 R, 71

[56] References Cited

U.S. PATENT DOCUMENTS

| | | |
|---|---|---|
| Re. 31,367 | 8/1983 | D'Entremont . |
| 1,828,299 | 10/1931 | Shuey . |
| 2,298,137 | 10/1942 | Lee . |
| 2,376,759 | 5/1945 | Dyer et al. . |
| 2,768,342 | 10/1956 | Vaughan et al. . |
| 2,892,910 | 6/1959 | Diabold . |
| 2,951,924 | 9/1960 | Schultz . |
| 3,168,661 | 2/1965 | Rini . |
| 3,243,679 | 3/1966 | Enemark . |
| 3,452,313 | 6/1969 | Perry . |
| 3,474,372 | 10/1969 | Davenport et al. . |
| 3,521,138 | 7/1970 | Enemark et al. . |
| 3,538,478 | 11/1970 | D'Entremont et al. . |
| 3,562,587 | 2/1971 | Forst . |
| 3,568,013 | 3/1971 | Htaha . |
| 3,569,781 | 3/1971 | Strachan . |
| 3,579,167 | 5/1971 | Grable . |
| 3,656,079 | 4/1972 | Lee . |
| 3,683,250 | 8/1972 | Fricker . |
| 3,695,054 | 10/1972 | Barry . |
| 3,718,879 | 2/1973 | Perry . |
| 3,750,082 | 7/1973 | Petersen et al. . |
| 3,794,949 | 2/1974 | Larsen et al. . |
| 3,842,188 | 10/1974 | Petersen . |
| 3,846,674 | 11/1974 | McNulty . |
| 3,858,140 | 12/1974 | Hancock . |
| 3,879,685 | 4/1975 | Epstein et al. . |
| 3,914,727 | 10/1975 | Fabricius . |
| 3,921,117 | 11/1975 | Blaha . |

(List continued on next page.)

FOREIGN PATENT DOCUMENTS 0 375 261   6/1990   European Pat. Off. .

OTHER PUBLICATIONS

Klixon Refrigeration Package from Texas Instruments 2SP Series, 1992.
Otter Motor Protectors, Thermal Safety Cut–Outs and Thermostats, no date indicated.
Search Report dated 28 Aug. 1996 for Great Britain Application No. GB 9611451.7.

*Primary Examiner*—Jeffrey A. Gaffin
*Assistant Examiner*—Michael J. Sherry
*Attorney, Agent, or Firm*—Wayne O. Traynham

[57] ABSTRACT

A combination motor starter and protector module is described. The base member, in one embodiment, forms a motor protector compartment and a motor starter compartment. The motor protector, in one form, is a bimetallic switch configured to be coupled between a power source and the motor windings. The switch includes a stationary contact and a movable contact. A bimetal element, responsive to current flow through the protector, controls movement of the movable contact. The starter, in one form, is a positive temperature coefficient resistor (PTCR) disk configured to be connected in series circuit with the motor start winding. The cover of the combination housing includes, in one form, an integral capacitor support arm and terminal openings for receiving blade terminals of a run capacitor. The terminal openings in the cover align with blade receiving receptacles coupled to the PTCR start circuit. The blade terminals of a run capacitor are inserted into the receptacle openings and into electrical engagement with the blade receiving receptacles. The capacitor is supported by the module cover, including the capacitor support arm.

39 Claims, 5 Drawing Sheets

U.S. PATENT DOCUMENTS

| | | |
|---|---|---|
| 3,925,748 | 12/1975 | Slocum . |
| 3,955,170 | 5/1976 | Geishecker . |
| 3,958,208 | 5/1976 | Blaha . |
| 3,963,962 | 6/1976 | Sutton . |
| 3,965,392 | 6/1976 | Moorhead et al. . |
| 3,988,709 | 10/1976 | Mckinnon et al. . |
| 4,015,229 | 3/1977 | Senor et al. . |
| 4,037,316 | 7/1977 | Stoll . |
| 4,039,992 | 8/1977 | Givier . |
| 4,042,860 | 8/1977 | Woods et al. . |
| 4,084,202 | 4/1978 | Stoll . |
| 4,086,558 | 4/1978 | Pejouhy et al. . |
| 4,100,468 | 7/1978 | Slocum . |
| 4,119,894 | 10/1978 | Sørensen . |
| 4,131,871 | 12/1978 | Haag et al. . |
| 4,181,393 | 1/1980 | Lill . |
| 4,198,669 | 4/1980 | Kulwicki . |
| 4,237,508 | 12/1980 | Woods et al. . |
| 4,237,510 | 12/1980 | Thompson, Jr. et al. . |
| 4,241,370 | 12/1980 | De Filippis et al. . |
| 4,250,419 | 2/1981 | Zolman . |
| 4,252,394 | 2/1981 | Miller . |
| 4,295,114 | 10/1981 | Pohl . |
| 4,319,299 | 3/1982 | Woods et al. . |
| 4,325,051 | 4/1982 | Rodriguez . |
| 4,334,162 | 6/1982 | Haag et al. . |
| 4,365,225 | 12/1982 | Olsen et al. . |
| 4,387,330 | 6/1983 | Zigler . |
| 4,387,412 | 6/1983 | Woods et al. . |
| 4,399,423 | 8/1983 | Nield . |
| 4,408,244 | 10/1983 | Weible . |
| 4,410,924 | 10/1983 | Hewitt et al. . |
| 4,422,120 | 12/1983 | Kobayashi et al. . |
| 4,423,405 | 12/1983 | Bar . |
| 4,467,385 | 8/1984 | Bandoli et al. . |
| 4,472,705 | 9/1984 | Carlson . |
| 4,492,886 | 1/1985 | Bar . |
| 4,493,144 | 1/1985 | Woods et al. . |
| 4,499,517 | 2/1985 | Lisauskas . |
| 4,527,142 | 7/1985 | De Filippis et al. . |
| 4,533,894 | 8/1985 | Bishop et al. . |
| 4,555,684 | 11/1985 | Slack . |
| 4,574,229 | 3/1986 | Kim . |
| 4,646,195 | 2/1987 | Lisauskas . |
| 4,689,595 | 8/1987 | Jørgensen . |
| 4,701,824 | 10/1987 | Beggs et al. . |
| 4,706,152 | 11/1987 | De Filippis et al. . |
| 4,713,717 | 12/1987 | Pejouhy et al. . |
| 4,862,306 | 8/1989 | Lisauskas . |
| 4,890,025 | 12/1989 | Hadeler et al. . |
| 4,901,204 | 2/1990 | Hayashi .................. 361/417 |
| 5,010,264 | 4/1991 | Yamada et al. . |
| 5,021,915 | 6/1991 | Wandler et al. . |
| 5,032,749 | 7/1991 | Stone . |
| 5,053,726 | 10/1991 | D'Entremont et al. . |
| 5,053,908 | 10/1991 | Cooper et al. . |
| 5,055,726 | 10/1991 | D'Entremont et al. ............ 310/71 |
| 5,170,307 | 12/1992 | Nacewicz et al. . |
| 5,345,126 | 9/1994 | Bunch . |

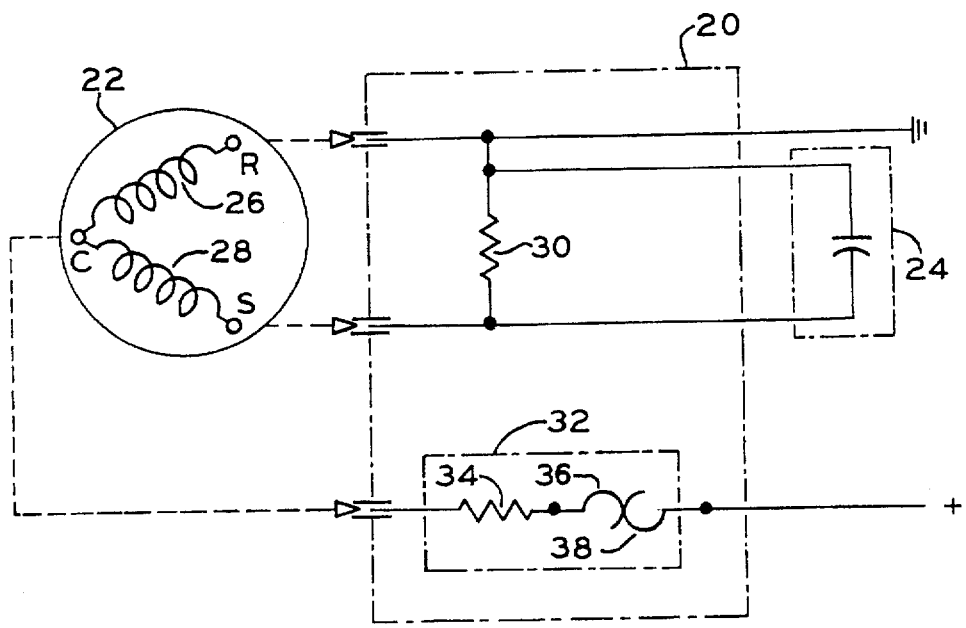
FIG_1
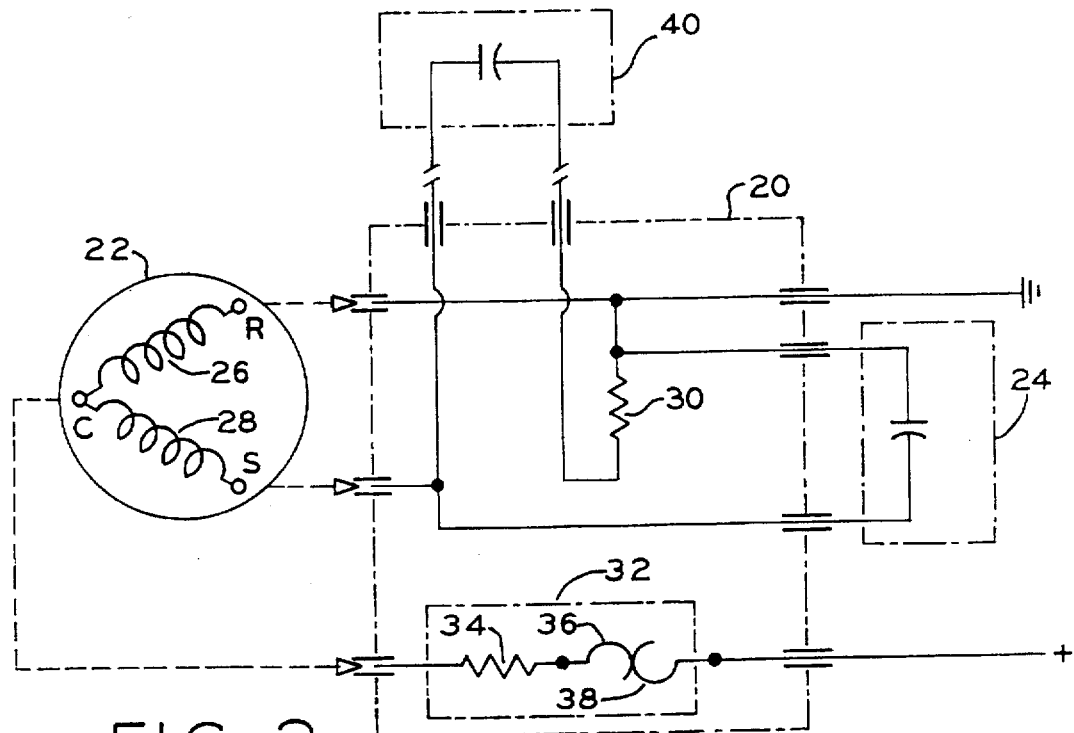
FIG_2

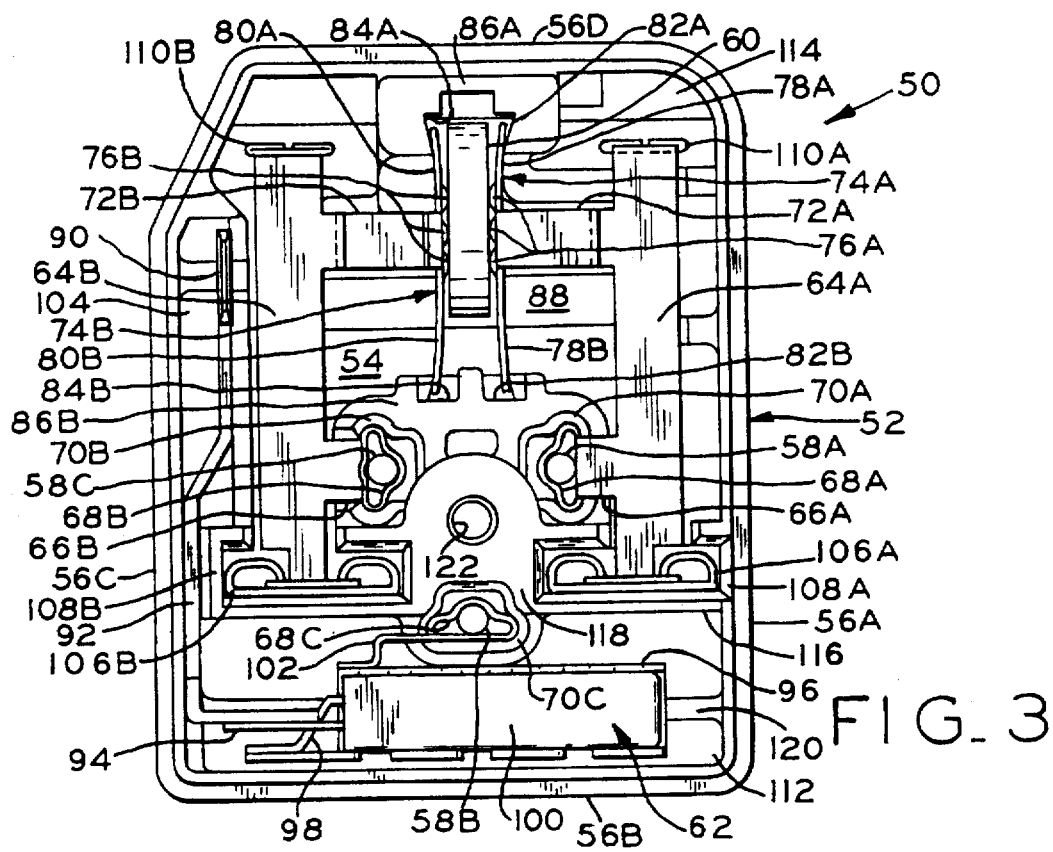
FIG_3
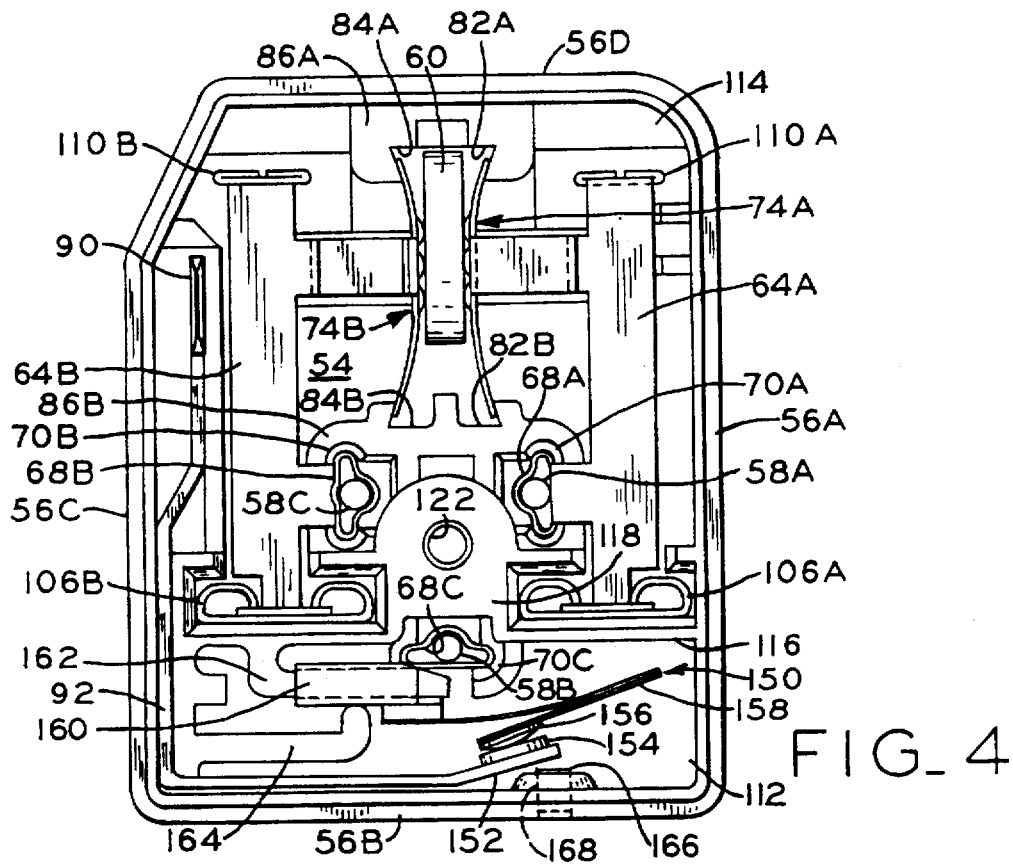
FIG_4

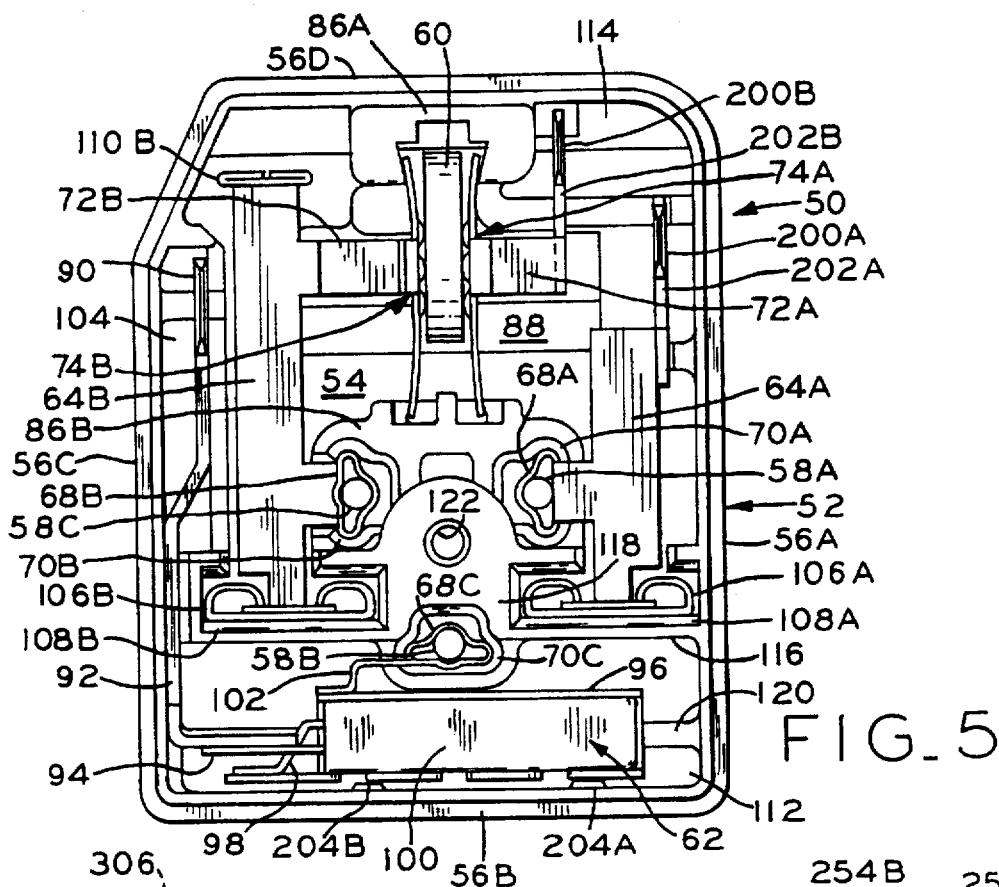
FIG_5
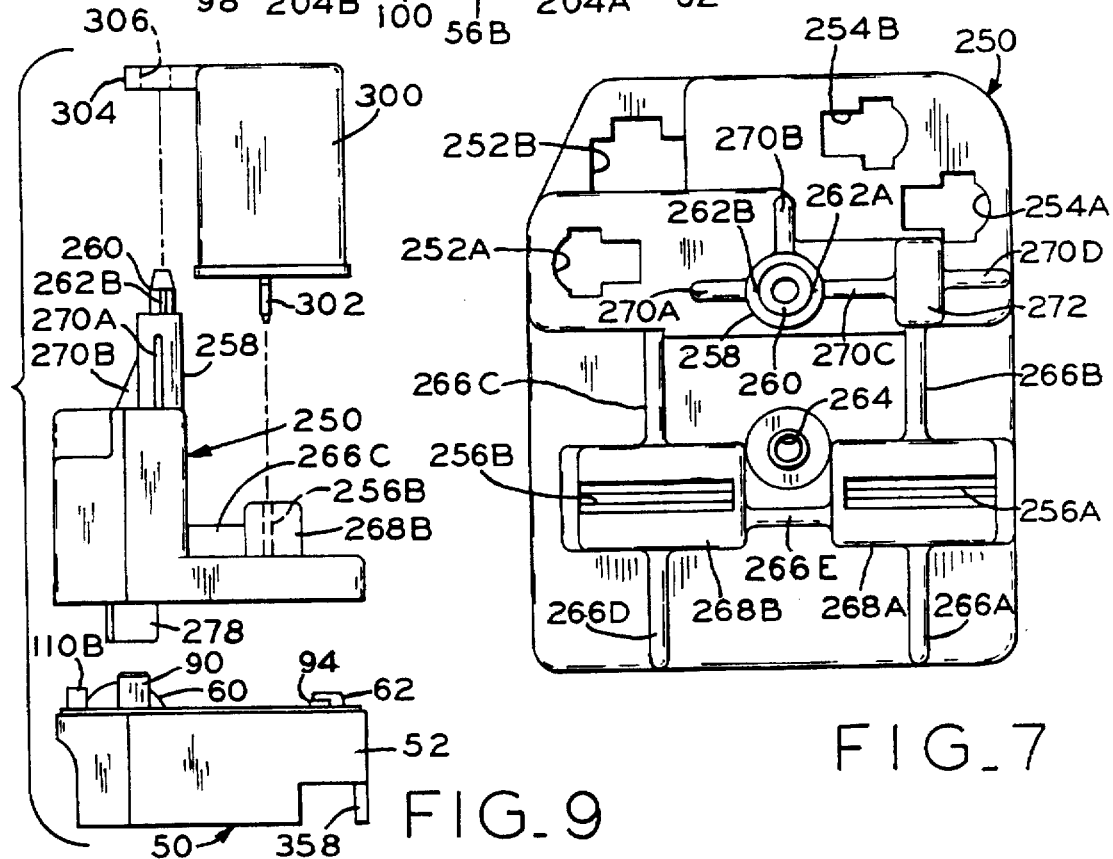
FIG_9
FIG_7

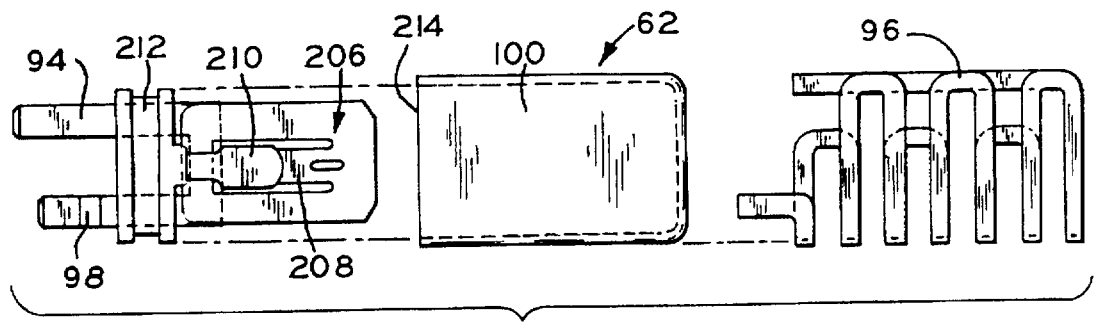
FIG_6A
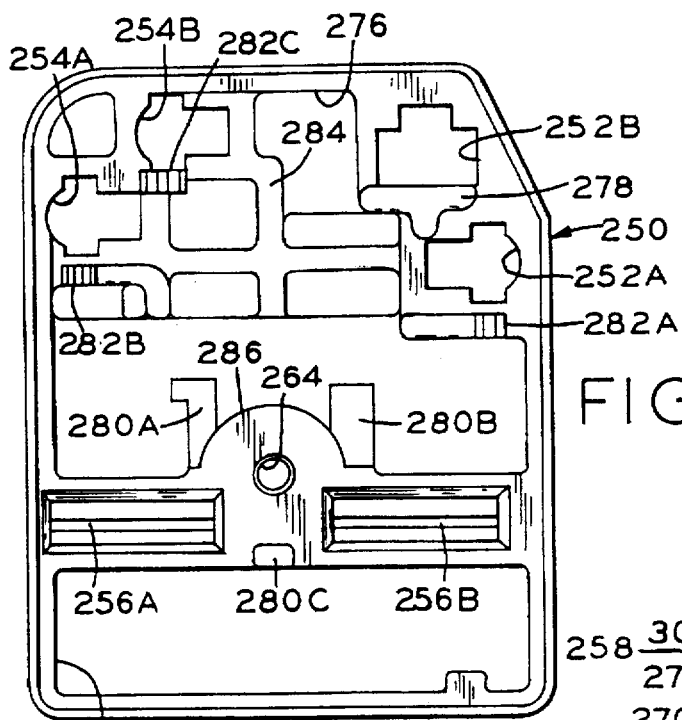
FIG.8
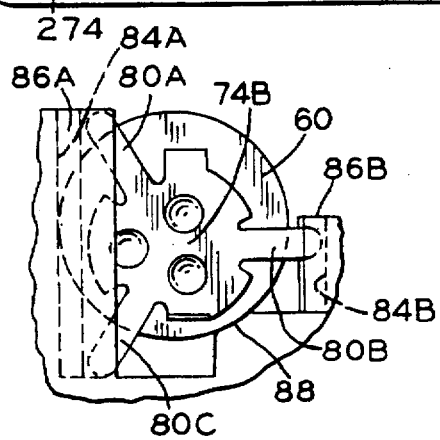
FIG_6B
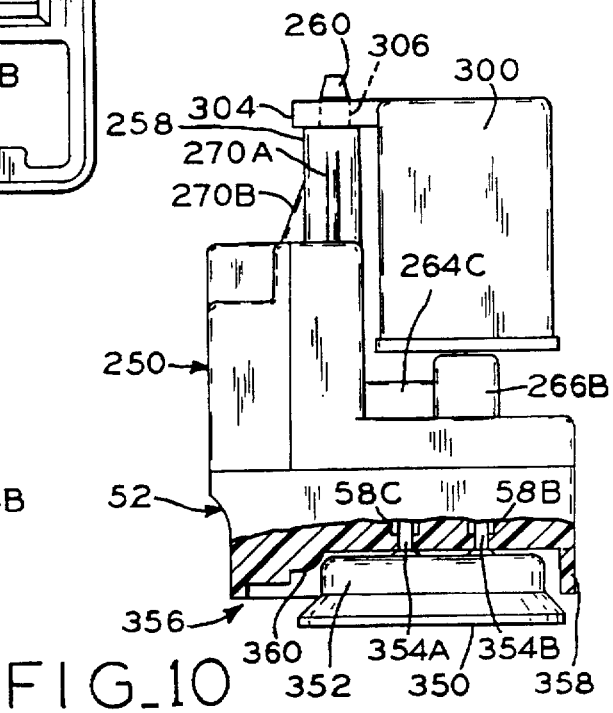
FIG_10

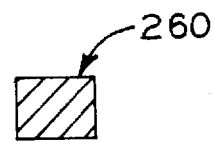
FIG._11A
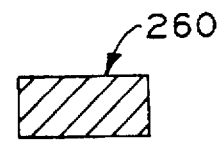
FIG._11B
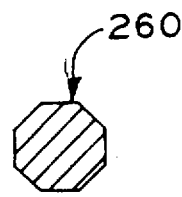
FIG._11C
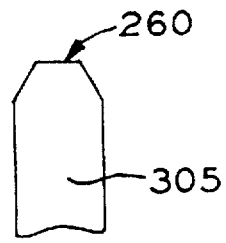
FIG._12

MOTOR STARTER AND PROTECTOR MODULE

FIELD OF THE INVENTION

This invention relates generally to a device useful in assisting with starting and protecting a dynamoelectric machine and, more particularly, to a combination motor starter and motor protector module particularly useful in connection with refrigeration compressor motors.

BACKGROUND OF THE INVENTION

Dynamoelectric machines such as motors typically include a start winding and a run winding. The start winding is utilized to initiate rotation of the motor rotor. Particularly, the magnetic field generated by the relatively high inductive reactance start winding in a resistance split phase motor may be about 30° out-of-phase (in both a physical sense and a time sense) with respect to the field generated by the relatively lower inductive reactance rim winding. When the run and start windings are energized, the geometric and time phase relationship between magnetic fields generated by the run and start windings, and the magnetization of the rotor, cause the rotor to begin rotating from a standstill condition. Once the rotor has sufficient torque to attain its normal running speed, the start winding is "switched out" of the motor circuit so that the out-of-time phase geometrically spaced magnetic field generated by the start winding does not adversely impact motor operation.

Start and run capacitors sometimes are utilized to change the time phase relationship between the magnetic fields generated by the run and start windings. A start capacitor connected in series circuit with the start winding causes the magnetic field generated by the start winding to be, for example, about 90° (rather than about 30°) out-of-time phase with the run winding field. As compared to a 30° time phase shift, a 90° time phase shift of the start winding magnetic field results in a higher starting torque, which is desirable in some applications.

Also, rather than switching out the start winding once sufficient rotor torque is attained, the start winding can be utilized as an auxiliary main winding after motor start-up if a run capacitor is connected in series circuit with the start winding. Particularly, the start winding and run capacitor remain in the motor circuit. Such a configuration results in better motor efficiency and power factor.

Motors may be designed for many different applications, a number of which applications do not require start and/or rim capacitors. When such capacitors are required, motors normally are adapted to receive externally mounted run and start capacitors. In the case of hermetically sealed compressor motors, a wiring harness is used to properly connect such capacitors into the motor circuit which, of course, is contained within the sealed compressor housing.

In addition to run and start capacitors, other externally mounted motor components may include motor protectors and motor start switches. Motor protector devices typically are employed in order to protect the motor windings against fault or over temperature conditions. For example, if an overload event occurs, excess current passes through the motor windings. A high current condition may damage the windings and possibly render the motor inoperable. A motor overload protector coupled between the motor windings and the motor power supply, and responsive to such a high current condition, operates to de-energize the motor windings if such a high current condition persists for a predetermined time period.

A motor starter switch, sometimes referred to herein as a "starter", may be employed to control the energization and de-energization of the motor start winding. A positive temperature coefficient resistor (PTCR), for example, may be used to perform this switching function. Such devices have been used particularly for many compressor motor applications.

A typical PTCR has a low resistance when cool but has an extremely high resistance when hot. The PTCR is connected, for example, in series circuit with the start winding. The temperature/resistance characteristic of the PTCR is selected so that the PTCR has a high resistance once the motor attains its normal running speed. Such a configuration provides the result that the start winding is substantially disassociated from the motor power supply after motor start-up. Of course, if a run or a start capacitor, or both, are coupled to the motor, alternative electrical connections can be made between the PTCR, start winding and capacitors.

In hermetic compressor applications, a motor starter switch and a motor protector typically are externally mounted to the compressor housing. The starter switch and protector are coupled to the motor circuit using a wiring harness.

Wiring harnesses for connecting capacitors, a starter switch and a protector to a motor are expensive to manufacture and can be complex. Connecting such harnesses to these components also, of course, requires extra time and labor.

By housing a starter switch and protector in one unit, manufacturing costs may be reduced and assembly of at least the starter and protector to a motor may be simplified. Examples of such units are set forth in U.S. Pat. Nos. 4,037,316, 4,042,860, and 4,084,202, all of which are assigned to the present assignee. With such a motor starter and protector unit, however, there still exists a need for providing an easy and simple manner for coupling start and run capacitors to the motor winding circuit.

Combination motor starter and motor protector units, such as the unit described in U.S. Pat. No. 4,237,508, which is assigned to the present assignee, provide leads which extend from the unit for coupling to an external capacitor. Although providing such leads facilitates coupling a capacitor to the unit, there exists a need for an even lower cost construction which further simplifies coupling an external capacitor to the motor winding circuit.

Another example of a combination motor starter and motor protector unit is set forth in U.S. Pat. No. 5,170,307. With respect to the unit described in U.S. Pat. No. 5,170,307, the housing which encloses the motor starter and motor protector includes slots for receiving the legs of a separate capacitor support bracket. The capacitor support bracket includes a capacitor support arm and recesses for receiving the blade terminals of a capacitor. Conductors extend from the recesses through the bracket legs and, when the bracket is mounted to the housing, connect to the motor start circuit. The separate capacitor bracket having embedded conductors is expensive to manufacture.

Accordingly, it is desirable and advantageous to provide a module for enclosing both a motor starter and a motor protector. It also is desirable and advantageous to provide such a module which is inexpensive to manufacture and enables easy and fast installation of a capacitor into the motor start circuit without a need for any additional components such as a separate capacitor bracket.

An object of the present invention is to provide a low cost combination module for a motor protector and a motor starter.

Another object of the present invention is to provide such a combination module which can be mounted to a compressor and electrically coupled to the compressor motor without the use of a wiring harness.

Still another object of the present invention is to provide such a combination module which enables mounting an external run capacitor thereto without the use of external leads or a separate capacitor bracket.

Still yet another object of the present invention is to provide a combination motor protector and starter module which enables mounting an external run capacitor thereto and which also enables electrically coupling a remotely mounted start capacitor thereto.

SUMMARY OF THE INVENTION

These and other objects of the invention are attained by several forms of apparatus which, in one embodiment, is a combination motor starter and protector module for an electric motor. In the one embodiment, both the motor starter and the motor protector are enclosed in the module. The module includes a base member and a cover. The module has a motor protector compartment and a motor starter compartment.

The motor protector, in one form, is a bimetallic switch configured to be coupled between a power source and the motor windings. The switch includes a stationary contact and a movable contact. A bimetal element, responsive to current flow through the protector, controls movement of the movable contact. The bimetal element normally is in a first configuration in which the movable contact is in a circuit-making condition with the stationary contact. The bimetal element remains in the first configuration as long as the temperature of the bimetal element does not rise to or above its calibrated "trip" temperature. If the bimetal element is heated to or above its calibrated "trip" temperature, the bimetal element, with a snap-action, moves to a second configuration in which the movable contact is separated from and in a circuit-breaking condition with respect to the stationary contact.

The motor starter, in one form, is a positive temperature coefficient resistor (PTCR) disc configured to be connected in circuit with the motor start winding. The PTCR has a low resistance when cool, and the PTCR initially enables sufficient current to flow through the motor start winding so that the start winding magnetic field effects a desired starting torque during the start-up period. If the motor start winding is in series circuit with the PTCR, as the temperature of the PTCR increases in response to current flow therethrough to the PTCR anomaly or transition temperature, the PTCR resistance to current flow increases to a value which generally renders the start winding ineffective so as to electrically disassociate the start winding from the run winding.

The cover of the combination housing includes, in one form, an integral capacitor support arm and receptacle openings for receiving spade terminals of a run capacitor. The receptacle openings in the cover align with spade receiving terminals or receptacles coupled in parallel circuit with the PTCR and enclosed within the housing. The spade terminals of a run capacitor are inserted into the receptacle openings and into electrical engagement with the spade receptacles. The run capacitor is supported by the module cover, including by the capacitor support arm. In the one form, the cover also has openings to enable connecting an energy source to the module power terminals and openings to enable leads from the start capacitor to be connected in series circuit with the PTCR.

The combination starter and protector module described above provides the advantage that both the motor starter and the motor protector are disposed within one housing. This construction greatly simplifies assembling the motor starter and protector to a compressor housing. Further, an external run capacitor is simply "plugged-in" to the module without requiring any external leads or a separate capacitor support bracket. Moreover, a remotely mounted start capacitor can be quickly and easily electrically coupled to the combination starter and protector module.

BRIEF DESCRIPTION OF THE DRAWINGS

FIG. 1 is a circuit schematic of a motor starter and protector circuit including a run capacitor.

FIG. 2 is a circuit schematic of a motor starter and protector circuit including a start capacitor and a run capacitor.

FIG. 3 is a top plan view of one embodiment of a combination motor starter and protector module including run capacitor receptacles.

FIG. 4 is a top plan view of another embodiment of a combination motor starter and protector module including run capacitor receptacles.

FIG. 5 is a top plan view of still another embodiment of a combination motor starter and protector module including run capacitor receptacles and start capacitor terminals.

FIG. 6A is an exploded top view of a motor protector unit including a heater element and FIG. 6B is a side view, with parts cut away, of a pressure plate and a PTCR.

FIG. 7 is a top plan view of a combination module cover.

FIG. 8 is a bottom plan view of the internal structure of the module cover shown in FIG. 7.

FIG. 9 is an exploded side view illustrating assembly of a base member and a cover member of a combination module and a run capacitor.

FIG. 10 is a side view of a combination module, coupled to a run capacitor, assembled to a compressor motor.

FIGS. 11A, 11B, and 11C are cross-sectional views through alternative geometries of the prong of the cover member.

FIG. 12 is a side view of the cover member prong having a partial thread.

DETAILED DESCRIPTION OF THE DRAWINGS

FIG. 1 is a circuit schematic of a combination starter and protector module 20 coupled to a motor 22 and a run capacitor 24. Motor 22 includes a run winding 26 and a start winding 28.

Module 20 includes a positive temperature coefficient resistor 30 (PTCR) and a protector unit 32. PTCR 30, as hereinafter described in more detail, preferably is a disk type PTCR, such as a PTCR disk available from CeraMite, a company located in Grafton, Wis. As is well known, a PTCR is operable generally in response to current flow therethrough to increase its resistance generally as a function of temperature.

Protector unit 32 includes a heater element 34, a movable contact 36 and a stationary contact 38. Contacts 36 and 38 are illustrated in the circuit schematic as forming a bimetal-type switch. Specifically, movable contact 36 is controlled by a bimetal element responsive to current flow through contacts 36 and 38 as hereinafter described in more detail. A bimetal switch including a movable contact 36 and stationary contact 38 controlled by a bimetal element is commercially available from Otter Controls, Limited, Hardwick Square South, Buxton, Derbyshire, SK17 6LA, England. Heater element 34 is in series circuit and thermal communication with the bimetal element.

As shown in FIG. 1, protector unit 32 is in series circuit between the common terminal C of motor windings 26 and 28 and an energy source. PTCR 30 is in parallel circuit with run capacitor 24 and is connected across run and start windings 26 and 28.

In operation, and for a "cold" start-up, i.e., the temperature of PTCR 30 is well-below the anomaly temperature and movable contact 36 is in its normal circuit-making condition with stationary contact 38, energy is supplied from the "+" terminal through protector unit 32 to common terminal C of motor 22. Both run and start windings 26 and 28 are energized.

In the "cold" start-up condition, PTCR 30 will allow sufficient current to flow through start winding 28 so that the magnetic field of start winding 28 effects a desired starting torque during the start-up period. Also, during the start-up period, the resistance of PTCR 30 is sufficiently low so that run capacitor 24 is substantially electrically disassociated from motor windings 26 and 28. With run capacitor 24 substantially disassociated from windings 26 and 28, the magnetic field generated by start winding 28 is, for example, about 30° out-of-time phase from the magnetic field generated by run winding 26.

As the temperature of PTCR 30 increases in response to current flow therethrough to the anomaly or transition temperature, the resistance of PTCR 30 to current flow also increases to a value which generally electrically disassociates PTCR 30 from start winding 28. The resistance of PTCR 30 will not act to obviate current flow therethrough, but PTCR 30 will throttle or restrict the passage of such current flow to such a minimal or small value that PTCR 30 is substantially electrically disassociated from start winding 28.

When PTCR 30 is substantially disassociated from start winding 28, run capacitor 24 is substantially associated with start winding 28. Under such conditions, start winding 28 functions as an auxiliary main winding.

Under normal start-up and running conditions, protector unit 32 is configured so as to allow motor 22 to remain energized. Protector unit 32 operates, however, to de-energize motor 22 under a fault condition such as a mechanically locked rotor, electrical failure of run winding 26 or start winding 28, failure of PTCR 30 such as by shorting or becoming an open circuit, a current overload condition, or high compressor shell and motor winding temperatures. Under such a fault condition, the temperature of the bimetal element increases and when such temperature reaches the calibrated "trip" temperature, the bimetal element "trips" or "snaps" to its second configuration, which causes movable contact 36 to break away from stationary contact 38 into a circuit-breaking condition. In such a circuit-breaking condition, motor windings 26 and 28 are de-energized.

When the bimetal element, heater element 34, and PTCR 30 sufficiently cool, the bimetal element "snaps" back to its first configuration which causes movable contact 36 to move back into a circuit-making condition with stationary contact 38. Motor windings 26 and 28 are therefore re-energized and motor 22 again initiates operation in the start-up mode. If the condition which caused the fault has been corrected, motor 22 will continue to operate. However, if such condition has not been corrected, the bimetal element will again be heated to the calibrated "trip" temperature and movable contact 36 will move into its circuit-breaking condition. Motor 22 will again be de-energized.

There are, of course, many variations of the embodiment illustrated in FIG. 1. For example, run capacitor 24 and its circuit connections could be totally eliminated. PTCR 30 would then be in series circuit with start winding 28. With such a configuration, when the temperature of PTCR 30 increases to its anomaly or transition temperature, the resistance of PTCR 30 to current flow generally renders start winding 28 ineffective so as to electrically disassociate start winding 28 from run winding 26.

Another configuration for combination motor starter and protector module 20 is illustrated in FIG. 2. In the FIG. 2 circuit schematic, a start capacitor 40 is provided. Particularly, start capacitor 40 is connected in series circuit with PTCR 30. Operation of the FIG. 2 embodiment is substantially similar to operation of the FIG. 1 embodiment with the exception that with start capacitor 40 and during the start-up period, start capacitor 40 is electrically associated with start winding 28. As a result, and during the start-up period, the magnetic field generated by start winding 28 is, for example, about 90° rather than 30° out-of-time phase with the magnetic field generated by run winding 26. When the temperature of PTCR 30 reaches the anomaly or transition temperature, PTCR 30 substantially disables or renders ineffective start capacitor 40.

The FIG. 2 embodiment could be modified to eliminate run capacitor 24 and its circuit connections. With such a configuration, start capacitor 40 is the only external capacitor. Operation of such a configuration is substantially similar to the operation as described above with respect to start capacitor 40. Run capacitor 24 and its associated affects are eliminated. Specifically, with run capacitor 24 eliminated, when PTCR 30 reaches its transition or anomaly temperature, start winding 28 is substantially disassociated from run winding 26.

FIG. 3 is a top plan view of a combination motor starter and protector module 50, with the module cover removed, configured in accordance with the circuit schematic illustrated in FIG. 1. Module 50 includes a base member 52 having a base surface 54 and sidewalls 56A–D extending from base surface 54 forming a partial enclosure. Pin receiving openings or apertures 58A–C are formed in base surface 54 and are spaced to receive pins which are coupled to a compressor motor and extend from a compressor motor housing (not shown). Such pins which extend from the compressor motor are typically referred to in the art as Fusite® pins or plugs and are manufactured by the Fusite Division of Emerson Electric Co. Mounted within base member 52 is a PTCR disk 60 and a protector unit 62. Conducting members 64A–B include first leg portions 66A–B which form female pin connectors or receptacles 68A–B. Female pin receptacles 68A–B align with apertures 58A and 58C, respectively, formed in base surface 54 and are sized to receive the Fusite pins which extend from the compressor motor housing. Receptacles 68A–B are located within receptacle supports 70A–B which extend from base surface 54. Although receptacles 68A–B are shown as being integrally formed with conducting members 64A–B, respectively, such receptacles 68A–B could be formed separately and then attached to conducting members 64A–B by, for example, spot welding.

Conducting members 64A–B also include second leg portions 72A–B which form PTCR contact plates 74A–B, sometimes referred to as pressure plates. Second leg portion 72A has two 90° bends which result in the upper surface of portion 72A to be stepped-up, or at a higher elevation, than other portions of conducting member 64A. Similarly, second leg portion 72B has two 90° bends which result in the upper surface of portion 72B to be stepped-down, or at a lower elevation, than other portions of conducting member 64B.

Pressure plates 74A–B have dimples 76A–B formed thereon. Fingers 78A–B and 80A–B extend from contact plates 74A–B and slide into grooves 82A–B and 84A–B formed in mounts 86A–B. Fingers 78A–B and 80A–B are biased so as to force and hold dimples 76A–B of contact plates 74A–B against and in electrical contact with PTCR disk 60. Fingers 78A–B and 80A–B are not in contact with PTCR disk 60. Although only one finger 78A and 80A on the upper portion of each contact plate 74A–B is shown in FIG. 3, each contact plate 74A–B has two fingers extending from contact plate 74A–B upper portion into grooves 82A and 84A as described hereinafter in more detail. Also, a portion of each contact plate 74A–B extends into grooves 82A and 84A.

In addition to contact plates 74A–B, a tapered surface 88 of base surface 54 also supports PTCR disk 60. As shown in FIG. 3, contact plates 74A–B and tapered surface 88 cooperate to maintain PTCR disk 60 in a vertical position relative to base surface 54. By maintaining PTCR disk 60 in such a vertical position, PTCR disk 60 may more quickly cool when protector unit 62 de-energizes the motor windings.

The specific configuration of conducting members 64A–B illustrated in FIG. 3 facilitates reducing manufacture costs since members 64A–B are, in the form illustrated in FIG. 3, identical. Conducting member 64A is simply "flipped over" in comparison to conducting member 64B. Such a structure reduces tooling costs and simplifies assembly of module 50. Of course, other configurations for conducting members 64A–B could be utilized.

Protector unit 62 is coupled to a power input terminal 90 by a conducting element 92. Particularly, a lead 94 extending from the stationary contact (not shown) of protector unit 62 is spot welded to conducting element 92. A heater element 96 is electrically connected in series circuit with the stationary and movable contacts (not shown) by spot welding a lead 98, which extends from the movable contact (not shown) of protector 62, to heater element 96. Heater element 96 may be formed from an 18% nickel-silver alloy or some other conducting metal such as stainless steel. The stationary and movable contacts are enclosed in a plastic housing 100, and heater element 96 is configured in a serpentine shape and disposed around housing 100. The movable contact is secured to a bimetal element. Housing 100 could, of course, be constructed of materials other than plastic such as ceramic and could have openings or vents formed therein to modify the heat transfer rate of the bimetal element. Heater element 96 is in contact with external surfaces of housing 100 and also is electrically connected, by a lead 102, to a female pin receptacle 68C aligned with pin receiving aperture 58B and located within connector support 70C.

Power terminal 90 and lead 92 are elevated relative to conducting member 64B to maintain lead 92 and conducting member 64B electrically separated. Specifically, power terminal 90 and lead 92 are supported on a platform 104 which extends inward from wall 56C and which facilitates maintaining such electrical separation.

Run capacitor receptacles 106A–B are connected to conducting members 64A–B, respectively. Receptacles 106A–B are disposed within support slots 108A–B which extend from base surface 54. Receptacles 106A–B are configured to receive the spade terminals of an external run capacitor (not shown). Receptacles 106A–B may be integrally formed with members 64A–B or attached to members 64A–B. For example, and as shown in FIG. 3, extensions of members 64A–B are bent at about a 90° angle and receptacles 106A–B are secured to such extensions. Each receptacle 106A–B is sufficiently long to be able to receive, at one end, such an extension of member 64A–B and, at the other end, a spade terminal of a run capacitor.

Terminal 110A formed by conducting member 64A is not utilized for an external connection in the configuration of module 50 shown in FIG. 3. Terminal 110B formed by conducting member 64B is utilized for making an external connection to ground. Terminals 110A–B are formed by bending, to about 90°, extensions of members 64A–B and folding over portions of such extensions as shown in FIG. 3.

Base member 52 of module 50 is generally configured to include a protector compartment 112 and a starter compartment 114. An integral wall 116 and a platform 118 separate compartments 112 and 114. In protector compartment 112, protector unit 62 is spaced above base surface 54 by spacers 120 which extend from, and are substantially perpendicular to, walls 56A and 56C. Only one spacer 120 extending perpendicular to wall 56A is shown in FIG. 3. A similar spacer extends perpendicular to wall 56C.

Although compartments 112 and 114 are separate, such compartments 112 and 114 are in thermal communication. Particularly, heat generated by PTCR disk 60 affects the temperature within protector compartment 112. The operational significance of such thermal communication is discussed hereinafter in more detail.

A fastener opening 122 is formed through platform 118. Opening 122 aligns with a similar opening in a module cover and an eyelet is inserted through the aligned openings. The eyelet is then crimped and secures the cover to base member 52. Of course, alternative structures and methods such as adhesives, a "snap fit", a rivet, a thread forming or cutting screw, or a heat staking or ultrasonic staking treatment could be utilized to secure the cover to base member 52.

The cover (not shown in FIG. 3) is placed over base member 52 to form an enclosure. The cover, as described and illustrated hereinafter in more detail, includes openings so that the spade terminals of a run capacitor and power leads from a power source can be connected to the appropriate receptacles and terminals. The cover should be sufficiently secured to base member 52, using the eyelet and/or heat staking treatment, for example, so that external contaminants which might cause malfunction of PTCR disk 60 or protector unit 62 are prevented from entering into module 50. In addition, the cover should be sufficiently secured to base member 52 so that in the event of a failure, the failure is contained within module 50.

To assemble module 50 to a compressor motor having Fusite pin connectors, openings 58A–C are aligned with the Fusite pins of the motor. Module 50 is then engaged to the Fusite pins so that each such pin is inserted through an opening 58A–C and is connected to a respective receptacle 68A–C. The envelope of module 50 can be configured so that module 50 fits within the fences of most high production refrigeration compressor motors.

When fully assembled and coupled to a compressor motor, a run capacitor and a power source, module 50 operates as described above in connection with the FIG. 1 circuit schematic. The size of PTCR disk 60 is selected based on the specific application. Preferably, the size of PTCR disk 60 is selected to be the minimum size which satisfies resistance/current/voltage conditions to optimize the cooling rate of PTCR disk 60. As described above, mounting PTCR disk 60 vertically, relative to base surface 54, may also facilitate an increased cooling rate for PTCR disk 60. Further, by providing that significant portions of the surfaces of PTCR disk 60 are not in close proximity to contact plates 74A–B, as described hereinafter in more detail, PTCR disk 60 may cool at an increased cooling rate when power is removed. In addition, if PTCR disk 60 fails by arcing over or cracking, the failure should result in a safe condition of PTCR disk 60, i.e., fails open. An example of ratings for PTCR disk 60 are set forth below.

Cold Resistance: 5 ohms to 15 ohms, 180 vac, 12 amp

Maximum Curie Temp. 125° C.

5.5 ohms resistance at 25° C.

Life: 550,000 starts (minimum)

A PTCR satisfying the above ratings should take out the start winding in less than 0.75–1.0 seconds at 8.0 amps during motor start-up for a cold start, and reset within 80 seconds in the event that power is cut-off.

With respect to protector unit 62, the temperature at which the bimetal element "trips" or "snaps" is selected based on motor current and application conditions to keep the motor winding temperature to less than the maximum temperature specified by the compressor motor manufacturer. The bimetal element and contacts should have a minimum load life capability of approximately 20,000 operations. Such components also should have sufficient life to withstand 30 days of actual compressor locked rotor conditions. The above stated characteristics may, of course, vary from application to application.

The "trip" temperature of protector unit 62 preferably is within ±10° C. of a nominal calibration based on compressor testing. The reset temperature of protector unit 62 preferably is within ±15° C. of a specified nominal. The reset temperature of protector unit 62 preferably is not below 55° C. to assure that protector unit 62 will reset under all application conditions. As an example, the bimetal element trip temperature could be 130° C. and the reset temperature could be 70° C.

FIG. 4 illustrates a protector 150, which is a different construction than protector unit 62, within protector compartment 112. Protector 150 can be utilized rather than protector unit 62. With respect to protector 150, conducting element 92 terminates in an offset portion 152 having a stationary contact 154 secured thereto, such as by spot welding. A moveable contact 156 is secured to a bimetal element 158. Bimetal element 158 is secured to a conducting brace 160 mounted to a first arm 162 extending from base surface 54. Brace 160 is electrically connected to female pin receptacle 68C. A second arm 164 extends from base surface 54 and provides additional support for brace 160. Although not shown in FIG. 4, a heater element could be disposed in series circuit with protector 150 and in thermal communication with protector 150.

Protector 150 operates in a similar manner to protector unit 62 (FIG. 3) in that in the event of a fault, movable contact 156 breaks away from stationary contact 154 under control of bimetal element 158. When this occurs, the motor windings are de-energized. When bimetal element 158, the heater element and PTCR disk 60 sufficiently cool, bimetal element 158 "snaps" back to its first configuration which causes movable contact 156 to move back into a circuit-making condition with stationary contact 154.

The position of stationary contact 154 relative to movable contact 156 can be adjusted by adjusting threaded pin 166 which extends through an opening 168 formed in sidewall 56B. Such adjustment controls, to some extent, the switch timing of movable contact 156.

Both protector unit 62 and protector 150 described above are generally referred to in the art as Taylor blade type protectors. Many other types of protectors, of course, could be utilized in place of such Taylor blade type protectors. For example, a PTCR disk having an appropriate temperature/resistance characteristic curve could be utilized as a protector.

Another modification of combination protector and starter module 50 is illustrated in FIG. 5. In the FIG. 5 embodiment, conducting leg 72A is broken away from conducting element 64A. Capacitor start terminals 200A and 200B are connected by conductors 202A and 202B, respectively, to conducting elements 64A and conducting leg 72A, respectively. Terminals 200A and 200B are utilized for coupling a start capacitor in series circuit with PTCR disk 60, as shown in the FIG. 2 circuit schematic. An additional difference between the FIG. 5 embodiment and the FIG. 3 embodiment is that protector compartment 110 of the FIG. 5 embodiment includes protector supports 204A and 204B which maintain protector unit 62 spaced from wall 56B. Of course, such supports 204A–B could be utilized in the previously discussed embodiments.

In addition to providing fast and easy mounting of a run capacitor to module 50, the FIG. 5 embodiment also provides fast and easy electrical connection of a start capacitor to module 50. For example, and with respect to the FIG. 5 embodiment, the cover that mounts on base member 52 includes openings which align with terminals 200A and 200B. Leads extending from a remotely mounted start capacitor are inserted through such cover openings and into electrical engagement with terminals 200A and 200B.

FIG. 6A is an exploded view of protector unit 62. Protector unit 62 includes plastic housing 100 and heater element 96 as hereinbefore described. Protector unit 62 further includes leads 94 and 98, and a bimetal element 206. A movable contact (not shown) is mounted on an intermediate leg 208 of bimetal element 206. A stationary contact 210 is aligned with the movable contact. Lead 98 is electrically connected to bimetal element 206. Stationary contact 210 is electrically connected to lead 94. Stationary contact 210 is mounted to a terminal block 212 which is formed, for example, from plastic.

Housing 100 is open at one end 214. Bimetal element 206 is inserted through open end 214 of housing 100 and open end 214 is substantially covered by terminal block 212. Leads 94 and 98 extend from housing 100. Housing 100 is then inserted within the opening defined by serpentine shaped heater element 96.

Bimetal element 206 has a first configuration in which the movable contact is disposed in a circuit-making condition with stationary contact 210. When bimetal element 206 is heated above its calibrated "trip" temperature, bimetal element 206 "trips" or "snaps" to a second configuration in which the movable contact is in a circuit-breaking condition with respect to stationary contact 210.

As described above, bimetal element 206 is disposed within plastic housing 100, which is placed in protector compartment 112 of module 50. Bimetal element 206 therefore is not in direct heat transfer relationship with the motor windings. Heater element 96 and PTCR disk 60 are, however, in a heat transfer relationship with bimetal element 206. Particularly, once bimetal element 206 "trips" and is in the second configuration, i.e., circuit-breaking configuration, heat supplied to bimetal element 206 from heater element 96 and from PTCR disk 60 provides that bimetal element 206 may remain in the second configuration for a longer period of time than if no such heat transfer relationship were provided. The heat transfer relationship as described above reduces the cycling rate of bimetal element 206 between the first and second configurations. By reducing the cycling rate of element 206, the movable contact remains in the circuit breaking condition for a longer period of time. As a result, the motor winding temperature is lower when the movable contact moves back into the circuit-making condition. By allowing the winding to cool to a lower temperature, the possibility of damage to the winding insulation material is reduced.

Protector unit 62 as shown in FIG. 6A is rotated 90° as compared to the orientation of protector unit 62 as shown in FIGS. 3 and 5. The particular orientation of protector unit 62 within compartment 112 can be selected based on a number of characteristics, including ease of assembly.

FIG. 6B is a side view, with parts cut away, of PTCR disk 60 and contact plate 74B. Contact plate 74B has three fingers 80A–C. Fingers 80A and 80C extend into groove 84A in mount 86A and finger 80B extends into groove 84B in mount 86B, as hereinbefore described. Contact plate 74A is identical in configuration to contact plate 74B. As hereinbefore explained, and as shown in FIG. 6B, significant portions of PTCR disk 60 are not in close proximity to plate 74B. This configuration may facilitate an increased cooling rate for PTCR disk 60.

FIG. 7 is a top plan view of a cover 250 which may be utilized in connection with base member 52 illustrated in FIG. 5. Cover 250 includes power lead openings 252A and 252B. Openings 252A and 252B are sized to receive leads from a power source and are specifically configured to prevent connecting, for example, an incorrect lead to power terminals 90 and 110B. Of course, the specific configuration of openings 252A–B could vary depending on the user's preference. For example, a dual receptacle plug could be used. Particularly, terminals 90 and 100B could be configured to extend through cover 250 and to mate with a dual female receptacle plug. Alternatively, openings 252A–B could be identical but labeled to indicate the desired connections.

Cover 250 also includes start capacitor lead openings 254A and 254B. Openings 254A and 254B, when cover 250 is mounted on base member 52 illustrated in FIG. 5, align with terminals 200A and 200B, respectively. If a start capacitor is not to be utilized such as in the FIG. 3 and 4 embodiments, openings 254A–B can be eliminated. As with openings 252A–B, other configurations could be used other than openings 254A–B shown in FIG. 7. For example, terminals 200A–B could be configured to extend through cover 250 and to mate with a dual female receptacle plug.

Cover 250 further includes tapered run capacitor openings 256A and 256B. When cover 250 is mounted on base member 52, openings 256A and 256B align with spade receiving receptacles 106A–B.

A capacitor support arm 258 including a capacitor engaging prong 260 extends from cover 250 and provides added support for a run capacitor when the run capacitor is mounted to cover 250. Opposing interference ribs 262A–B extend from prong 260 and provide resistance to separation between prong 260 and the run capacitor as hereinafter described.

Cover 250 also includes a fastener opening 264 which, when cover 250 is mounted to base member 52, aligns with opening 122 formed in platform 118. As hereinbefore described, an eyelet may be inserted through aligned openings 264 and 122 and crimped to maintain cover 250 secured to base member 52.

Support members 266A–E provide added support and rigidity for terminal mounts 268A–B. Capacitor support arm 258 is provided with additional rigidity by supports 270A, 270B and 270C. A stop arm 272 is utilized for securing a retaining strap (not shown) which is connected, for example, to a fence welded to the compressor housing around the Fusite pins. Such a strap is inserted between stop arm 272 and prong 260 and assists in retaining module 50 secured to the compressor.

If a run capacitor is not to be utilized, run capacitor openings 256A–B can be eliminated. Also, capacitor support arm 258 can be eliminated.

FIG. 8 is a bottom view of cover 250 and illustrates the internal structure of cover 250. More particularly, cover 250 includes a protector cavity 274 for receiving a portion of protector unit 62 and a starter cavity 276 for receiving a portion of motor starter PTCR disk 60. An electrical barrier 278 provides spacing between power leads which may be inserted through openings 252A–B.

Tabs 280A–C are utilized to restrict movement of female pin receptacles 68A–C. Particularly, when cover 250 is secured to base member 52, each tab 280A–C is in contact with an upper surface of one of receptacles 68A–C. As the Fusite pin connectors engage receptacles 68A–C, tabs 280A–C prevent such receptacles 68A–C from moving axially relative to supports 70A–C. Tabs 280A–C therefore assist in ensuring good engagement between female pin receptacles 68A–C and the Fusite pins.

Terminal position guides 282A–C align terminals 90, 200A and 200B with respective openings 252A, 254A and 254B. Support 284 provides additional rigidity for cover 250. A platform 286, configured to be in substantial surface-to-surface contact with platform 118 of base member 52, provides added support for assembled module 50.

Cover 250 and base member 52 can be formed from many different types of materials. In one form, cover 250 and base member 52 are formed from plastic materials such as thermoplastic or thermoset materials utilizing an injection molding process. Terminals 90, 106A–B, 110B and 200A–B and conducting members 64A–B (including female pin receptacles 68A–C and pressure plates 74A–B) may be formed, for example, from stainless steel, copper, brass or other well known conductive materials.

FIG. 9 is an exploded view illustrating assembly of cover 250 to base 52 to form combination module 50. FIG. 9 also illustrates a run capacitor 300 configured for mounting to module 50. As shown in FIG. 9, run capacitor 300 includes two spade terminals 302 (only one such terminal is visible in FIG. 9) and a tab 304. Tab 304 includes an opening 306 formed therethrough.

To assemble capacitor 300 to module 50, spade terminals 302 are inserted through terminal openings 256A and 256B of cover 250 and into electrical contact with spade receiving receptacles 106A–B. Opening 306 in tab 304 aligns with prong 260 of capacitor support arm 258. Prong 260 is inserted through opening 306. Ribs 262A–B form an interference fit with the sidewall of opening 306. Such interference fit facilitates retaining capacitor 300 on module 50. The construction of prong 260 and ribs 262A–B enables retention of a variety of capacitors and simplifies assembly of capacitor 300 to module 50. As alternative constructions, and rather than having a generally cylindrical shape, prong 260 could have a generally square (FIG. 11A), rectangular (FIG. 11B), or other cross-sectional shape configured so that edges thereof form an interference fit with the sidewall of opening 306. Also, protuberances other than ribs 262A–B, such as partial threads 305, could be formed on prong 260 to form an interference fit with the sidewalls of opening 306.

FIG. 10 illustrates an assembled combination module 50 and run capacitor 300 secured to a compressor motor 350 (substantially cut-away) including a Fusite pin connector 352 having Fusite pins 354A-B. Fusite pin connector 352 has three Fusite pins, and only two of such pins 354A-B are visible in FIG. 10. The two Fusite pins 354A-B shown in FIG. 10 extend into apertures 58B-C in base member 52 and into electrical contact with female pin receptacles 68B-C (not shown in FIG. 10). The other Fusite pin which is not visible in FIG. 10 extends into aperture 58A and into electrical contact with female pin receptacle 68A.

A surface 356 of base member 52 which contacts motor 350 and Fusite pin connector 352 includes a projection or fence 358 which limits movement of module 50 relative to motor 350. A stepped surface 360 provides clearance for connector 352.

Many different variations and modifications of module 50 are contemplated. For example, protector unit 62 could include one of many various other switches or cut-out controls. Also, rather than PTCR disk 60, various other motor starter switches could be utilized.

The combination starter and protector module embodiments described herein provide the advantage that both the motor starter and the motor protector are disposed within one housing. Further, the module can be easily and quickly coupled to an electric motor. Such a configuration reduces the expense associated with mounting such a starter and protector to an electric motor. Further, the combination module may be easily and quickly connected to an external capacitor without requiring the use of a wiring harness or capacitor support bracket.

From the preceding description of several embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A combination motor starter and motor protector module configured to couple to an electric motor having a run winding and a start winding, a housing enclosing the motor and having a plurality of pins extending therefrom including at least a first pin in electrical circuit with the run winding, a second pin in electrical circuit with the start winding, and a third pin in electrical circuit with a common connection between the run and start winding, said module comprising:

a base member having a base surface and sidewalls forming at least a partial enclosure, a first aperture formed in said base surface and configured to be aligned with the first pin in electrical circuit with the motor run winding, a second aperture formed in said base surface and configured to be aligned with the second pin in electrical circuit with the motor start winding, and a third aperture formed in said base surface and configured to be aligned with the third pin in electrical circuit with the motor run and start winding common connection;

a motor starter at least partially disposed within said partial enclosure;

a motor protector at least partially disposed within said partial enclosure;

a first electrical conductor member including a first pin receiving receptacle aligned with said first aperture and configured to receive and be in electrical contact with the first pin, said first electrical conductor member being in electrical circuit with said motor starter;

a second electrical conductor member including a second pin receiving receptacle aligned with said second aperture and configured to receive and be in electrical contact with the second pin, said second electrical conductor member being in electrical circuit with said motor starter;

a third electrical conductor member including a third pin receiving receptacle aligned with said third aperture and configured to receive and be in electrical contact with the third pin, said third electrical conductor member being in electrical circuit with said motor protector;

a first capacitor receptacle at least partially disposed within said partial enclosure and in electrical circuit with said first electrical conductor member;

a second capacitor receptacle at least partially disposed within said partial enclosure and in electrical circuit with said second electrical conductor member;

first and second power terminals at least partially disposed within said partial enclosure, said first power terminal being in electrical circuit with said motor protector and said second power terminal being in electrical circuit with said first electrical conductor member; and a cover for mating with said base member to form an enclosure in combination with said base member, said cover including first and second capacitor receptacle openings formed therein and configured to align with said first and second capacitor receptacles, respectively.

2. A combination module in accordance with claim 1 wherein said motor starter comprises a positive temperature coefficient resistor.

3. A combination module in accordance with claim 2 wherein said positive temperature coefficient resistor is shaped in the form of a disk.

4. A combination module in accordance with claim 3 wherein said first and second electrical conductor members each include a contact plate in electrical contact with said disk.

5. A combination module in accordance with claim 4 wherein said base member further includes finger receiving portions and each of said contact plates has a plurality of resilient fingers extending therefrom.

6. A combination module in accordance with claim 1 wherein said protector comprises a stationary contact and a movable contact, said protector further comprises a bimetal element which controls movement of said movable contact from a circuit-making condition to a circuit-breaking condition with respect to said stationary contact.

7. A combination module in accordance with claim 6 wherein said protector further comprises a housing, said bimetal element being disposed within said housing.

8. A combination module in accordance with claim 7 wherein said third electrical conductor member further includes a heater element disposed around at least a portion of said housing.

9. A combination module in accordance with claim 8 wherein said heater element has a serpentine shape.

10. A combination module in accordance with claim 1 wherein said first, second and third pin receiving receptacles are female pin receptacles configured to receive Fusite-type pins.

11. A combination module in accordance with claim 1 wherein said protector is a Taylor blade type protector.

12. A combination module in accordance with claim 1 wherein said cover further comprises a capacitor support arm extending therefrom, said arm comprising a prong having at least one protuberance thereon.

13. A combination module in accordance with claim 1 wherein said base member and said cover are molded from plastic material.

14. A combination module in accordance with claim 1 wherein said first and second conducting members are substantially formed from stainless steel.

15. A combination motor starter and motor protector module configured to couple to an electric motor having a run winding and a start winding, a housing enclosing the motor and having a plurality of pins extending therefrom, a first pin in electrical circuit with the run winding, a second pin in electrical circuit with the start winding, and a third pin in electrical circuit with a common connection between the run and start winding, said module comprising:

a base member having a base surface and sidewalls forming at least a partial enclosure, a first aperture formed in said base surface and configured to be aligned with the first pin in electrical circuit with the motor run winding, a second aperture formed in said base surface and configured to be aligned with the second pin in electrical circuit with the motor start winding, and a third aperture formed in said base surface and configured to be aligned with the third pin in electrical circuit with the motor run and start winding common connection;

a motor starter at least partially disposed within said partial enclosure, said motor starter comprising a positive temperature coefficient resistor disk;

a motor protector at least partially disposed within said partial enclosure;

a first electrical conductor member including a first pin receiving receptacle aligned with said first aperture and configured to receive and be in electrical contact with the first pin, said first electrical conductor member further including a first contact plate in electrical circuit with said motor starter;

a second electrical conductor member including a second pin receiving receptacle aligned with said second aperture and configured to receive and be in electrical contact with the second pin, said second electrical conductor member further including a second contact plate in electrical circuit with said motor starter; and a third electrical conductor member including a third pin receiving receptacle aligned with said third aperture and configured to receive and be in electrical contact with the third pin, said third electrical conductor member being in electrical circuit with said motor protector.

16. A combination module in accordance with claim 15 wherein said base member further includes finger receiving portions and each of said first and second contact plates has a plurality of resilient fingers extending therefrom.

17. A combination module in accordance with claim 15 wherein said module further comprises:

a first capacitor receptacle at least partially disposed within said partial enclosure and in electrical circuit with said first electrical conductor member;

a second capacitor receptacle at least partially disposed within said partial enclosure and in electrical circuit with said second electrical conductor member;

first and second power terminals at least partially disposed within said partial enclosure, said first power terminal being in electrical circuit with said motor protector and said second power terminal being in electrical circuit with said first electrical conductor member; and a cover for mating with said base member to form an enclosure in combination with said base member, said cover including first and second capacitor receptacle openings formed therein and configured to align with said first and second capacitor receptacles, respectively.

18. A combination module in accordance with claim 15 wherein said protector comprises a stationary contact and a movable contact, said protector further comprises a bimetal element which controls movement of said movable contact from a circuit-making condition to a circuit-breaking condition with respect to said stationary contact.

19. A combination module in accordance with claim 18 wherein said protector further comprises a housing, said bimetal element being disposed within said housing.

20. A combination module in accordance with claim 19 wherein said third electrical conductor member further includes a heater element disposed around at least a portion of said housing.

21. A combination module in accordance with claim 20 wherein said heater element has a serpentine shape.

22. A combination module in accordance with claim 15 wherein said first, second and third pin receiving receptacles are female pin receptacles configured to receive Fusite-type pins.

23. A combination module in accordance with claim 15 wherein said protector is a Taylor blade type protector.

24. A combination motor starter and motor protector module configured to couple to an electric motor having a run winding and a start winding, said module comprising:

a base member having a base surface and sidewalls forming at least a partial enclosure, a motor starter at least partially disposed within said partial enclosure;

a motor protector at least partially disposed within said partial enclosure;

a first electrical conductor member configured to be in electrical circuit with the motor run winding;

a second electrical conductor member configured to be in electrical circuit with said motor start winding;

a first capacitor receptacle at least partially disposed within said partial enclosure and in electrical circuit with said first electrical conductor member;

a second capacitor receptacle at least partially disposed within said partial enclosure and in electrical circuit with said second electrical conductor member; and a cover for mating with said base member to form an enclosure in combination with said base member, said cover including first and second capacitor receptacle openings formed therein and configured to align with said first and second capacitor receptacles, respectively.

25. A combination module in accordance with claim 24 wherein a housing encloses the motor, the housing having a plurality of pins extending therefrom including at least a first pin in electrical circuit with the run winding, a second pin in electrical circuit with the start winding, and a third pin in electrical circuit with a common connection between the run and start winding, and said module further comprises:

a first aperture formed in said base surface and configured to be aligned with the first pin in electrical circuit with the motor run winding, a second aperture formed in said base surface and configured to be aligned with the second pin in electrical circuit with the motor start winding, and a third aperture formed in said base surface and configured to be aligned with the third pin in electrical circuit with the motor run and start winding common connection.

26. A combination module in accordance with claim 25 wherein said first conducting member includes a first pin receiving receptacle aligned with said first aperture and configured to receive and be in electrical contact with the first pin, and said second conducting member includes a second pin receiving receptacle aligned with said second aperture and configured to receive and be in electrical contact with the second pin.

27. A combination module in accordance with claim 25 further comprising:
a third electrical conductor member including a third pin receiving receptacle aligned with said third aperture and configured to receive and be in electrical contact with the third pin, said third electrical conductor member being in electrical circuit with said motor protector.

28. A combination module in accordance with claim 24 further comprising:
first and second power terminals at least partially disposed within said partial enclosure, said first power terminal being in electrical circuit with said motor protector and said second power terminal being in electrical circuit with said first electrical conductor member.

29. An electric motor, comprising:
at least one run winding;
at least one start winding; and
a combination motor starter and motor protector module comprising a base member having a base surface and sidewalls forming at least a partial enclosure, a motor starter at least partially disposed within said partial enclosure, a motor protector at least partially disposed within said partial enclosure, a first electrical conductor member in electrical circuit with said motor run winding, a second electrical conductor member in electrical circuit with said motor start winding, a first capacitor receptacle at least partially disposed within said partial enclosure and in electrical circuit with said first electrical conductor member, a second capacitor receptacle at least partially disposed within said partial enclosure and in electrical circuit with said second electrical conductor member, and a cover for mating with said base member to form an enclosure in combination with said base member, said cover including first and second capacitor receptacle openings formed therein and configured to align with said first and second capacitor terminals, respectively.

30. An electric motor in accordance with claim 29 wherein a housing encloses said motor and said housing has a plurality of pins extending therefrom including at least a first pin in electrical circuit with said run winding, a second pin in electrical circuit with said start winding, and a third pin in electrical circuit with a common connection between said run and start windings, and said combination module further comprises a first aperture formed in said base surface and configured to be aligned with said first pin in electrical circuit with said motor run winding, a second aperture formed in said base surface and configured to be aligned with said second pin in electrical circuit with said motor start winding, and a third aperture formed in said base surface and configured to be aligned with said third pin in electrical circuit with said motor run and start winding common connection.

31. An electric motor in accordance with claim 30 wherein said first conducting member includes a first pin receiving receptacle aligned with said first aperture and in electrical contact with said first pin, and said second conducting member includes a second pin receiving receptacle aligned with said second aperture and in electrical contact with said second pin.

32. An electric motor in accordance with claim 30 further comprising:
a third electrical conductor member including a third pin receiving receptacle aligned with said third aperture and in electrical contact with said third pin, said third electrical conductor member being in electrical circuit with said motor protector.

33. A method for assembling an external capacitor and a combination motor starter and motor protector module to a motor having run and start windings, a housing enclosing the motor and having a plurality of pins extending therefrom including at least a first pin in electrical circuit with the run winding, a second pin in electrical circuit with the start winding, and a third pin in electrical circuit with a common connection between the run and start windings, the module including a base member having a base surface including a first aperture configured to be aligned with the first pin, a second aperture configured to be aligned with the second pin, and a third aperture configured to be aligned with the third pin, the base member further having first and second capacitor receptacles at least partially disposed within the partial enclosure and a cover for mating with the base member to form an enclosure in combination with the base member, the cover including first and second capacitor receptacle openings formed therein and configured to align with the first and second capacitor receptacles, respectively, said method including:
inserting the first, second and third pins into the first, second and third apertures, respectively, in the base surface of the base member; and
inserting the terminals of the capacitor into the capacitor receptacle openings formed in the module cover.

34. A method in accordance with claim 33 wherein said method further includes coupling a power lead into electrical contact with the power terminal.

35. A method in accordance with claim 33 wherein said method further includes coupling a start capacitor lead to the start capacitor terminal opening.

36. A combination motor starter and motor protector module configured to couple to an electric motor having a run winding and a start winding, a housing enclosing the motor and having a plurality of pins extending therefrom including at least a first pin in electrical circuit with the run winding, a second pin in electrical circuit with the start winding, and a third pin in electrical circuit with a common connection between the run and start winding, said module comprising:
a base member having a base surface and sidewalls forming at least a partial enclosure, a first aperture formed in said base surface and configured to be aligned with the first pin in electrical circuit with the motor run winding, a second aperture formed in said base surface and configured to be aligned with the second pin in electrical circuit with the motor start winding, and a third aperture formed in said base surface and configured to be aligned with the third pin in electrical circuit with the motor run and start winding common connection;
a motor starter at least partially disposed within said partial enclosure;
a motor protector at least partially disposed within said partial enclosure;
a first electrical conductor member including a first pin receiving receptacle aligned with said first aperture and configured to receive and be in electrical contact with the first pin, said first electrical conductor member being in electrical circuit with said motor starter;

a second electrical conductor member including a second pin receiving receptacle aligned with said second aperture and configured to receive and be in electrical contact with the second pin, a third electrical conductor member including a third pin receiving receptacle aligned with said third aperture and configured to receive and be in electrical contact with the third pin, said third electrical conductor member being in electrical circuit with said motor protector;

a fourth electrical conductor member being in electrical circuit with said motor starter;

a first start capacitor terminal at least partially disposed within said partial enclosure and in electrical circuit with said second electrical conductor;

a second start capacitor terminal at least partially disposed within said partial enclosure and in electrical circuit with said fourth electrical conductor;

first and second power terminals at least partially disposed within said partial enclosure, said first power terminal being in electrical circuit with said motor protector and said second power terminal being in electrical circuit with said first electrical conductor member; and a cover for mating with said base member to form an enclosure in combination with said base member.

37. A combination module in accordance with claim 36 further comprising:

a first run capacitor receptacle at least partially disposed within said partial enclosure and in electrical circuit with said first electrical conductor member;

a second run capacitor receptacle at least partially disposed within said partial enclosure and in electrical circuit with said second electrical conductor member; and said cover further comprising first and second run capacitor receptacle openings formed therein and configured to align with said first and second run capacitor receptacles, respectively.

38. A combination module in accordance with claim 36 wherein said motor starter comprises a positive temperature coefficient resistor.

39. A combination module in accordance with claim 36 wherein said protector comprises a stationary contact and a movable contact, said protector further comprises a bimetal element which controls movement of said movable contact from a circuit-making condition to a circuit-breaking condition with respect to said stationary contact.

* * * * *